(12) United States Patent
Tondorf

(10) Patent No.: US 6,871,417 B2
(45) Date of Patent: Mar. 29, 2005

(54) METHOD FOR MOUNTING A LENGTH MEASURING DEVICE AND CORRESPONDING LENGTH MEASURING DEVICE

(75) Inventor: Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/333,966

(22) PCT Filed: Sep. 19, 2001

(86) PCT No.: PCT/EP01/10799

§ 371 (c)(1),
(2), (4) Date: Aug. 8, 2003

(87) PCT Pub. No.: WO02/44654

PCT Pub. Date: Jun. 6, 2002

(65) Prior Publication Data

US 2004/0040139 A1 Mar. 4, 2004

(30) Foreign Application Priority Data

Nov. 29, 2000 (DE) .......................................... 100 59 308

(51) Int. Cl.⁷ .............................................. G01B 11/04
(52) U.S. Cl. ....................................................... 33/706
(58) Field of Search .......................... 33/706, 707, 708, 33/DIG. 1

(56) References Cited

U.S. PATENT DOCUMENTS

| | | | |
|---|---|---|---|
| 4,569,137 A | | 2/1986 | Ichikawa |
| 4,843,729 A | | 7/1989 | Nagaoka et al. |
| 4,909,683 A | | 3/1990 | Kopidlowski et al. |
| 4,936,023 A | * | 6/1990 | Pechak ......................... 33/706 |
| 4,991,311 A | | 2/1991 | Nagaoka et al. |
| 5,016,359 A | | 5/1991 | Nagaoka et al. |
| 5,655,311 A | * | 8/1997 | Affa ............................. 33/706 |
| 5,842,283 A | * | 12/1998 | Yatsu et al. .................... 33/706 |
| 6,119,359 A | * | 9/2000 | Suzuki et al. .................. 33/832 |
| 6,145,213 A | * | 11/2000 | Shimano et al. .............. 33/702 |
| 6,349,481 B1 | | 2/2002 | Nelle ........................... 33/702 |
| 6,637,118 B2 | * | 10/2003 | Feichtinger ................. 33/1 PT |
| 6,658,754 B2 | * | 12/2003 | Omi ............................. 33/706 |
| 6,701,634 B2 | * | 3/2004 | McMurtry et al. ............. 33/706 |

FOREIGN PATENT DOCUMENTS

| | | |
|---|---|---|
| DE | 37 15 908 C2 | 8/1990 |
| DE | 199 14 311 A1 | 10/2000 |
| EP | 0 922 927 A2 | 6/1999 |
| EP | 1 041 363 A2 | 10/2000 |

* cited by examiner

Primary Examiner—Christopher W. Fulton
(74) Attorney, Agent, or Firm—Brinks Hofer Gilson & Lione

(57) ABSTRACT

A length measuring system that includes a length measuring device and at least one mounting element, which exerts an attractive force between a support and the length measuring device. One or more of the at least one mounting element are of such a size that a frictional force, which is a function of a total attractive force, assures on one hand an adhesion of the length measuring device to the support and, on another hand, also assures displaceablity of the length measuring device along the support during mounting.

26 Claims, 4 Drawing Sheets

METHOD FOR MOUNTING A LENGTH MEASURING DEVICE AND CORRESPONDING LENGTH MEASURING DEVICE

Applicant claims, under 35 U.S.C. §§ 120 and 365, the benefit of priority of the filing date of Sep. 19, 2001 of a Patent Cooperation Treaty patent application, copy attached, Serial Number PCT/EP01/10799, filed on the aforementioned date, the entire contents of which are incorporated herein by reference, wherein Patent Cooperation Treaty patent application Serial Number PCT/EP01/10799 was not published under PCT Article 21(2) in English.

Applicant claims, under 35 U.S.C. § 119, the benefit of priority of the filing date of Nov. 29, 2000 of a German patent application, copy attached, Serial Number 100 59 308.9, filed on the aforementioned date, the entire contents of which are incorporated herein by reference.

BACKGROUND OF THE INVENTION

1. Field of the Invention

The present invention relates to a method for mounting a length measuring device, as well as the corresponding length measuring device itself.

2. Description of the Related Art

Such length measuring devices are used for example, as linear distance measuring devices in automation technology or for testing devices. Length measuring devices are also used on machine tools in very many cases. It is necessary there to measure the length of the carriage in relation to the machine bed with great accuracy. For this purpose the housing containing the scale graduation is fixedly screwed to the machine bed, for example, and the scanning unit of the length measuring device is connected with the movable carriage of the machine tool.

Often the length measuring devices are delivered as pre-assembled units, which means that the scale and the scanning unit, which can be moved in the measuring direction, are located together in one housing. Length measuring devices of this type are called closed, or encapsulated length measuring devices. But there are also so-called open length measuring devices, wherein the scanning unit and the scale are delivered separately.

It is necessary in both cases to align and fasten the housing, or the scale, with the greatest possible parallelism with respect to the measuring direction of the support, for example a machine tool.

In what follows, length measuring device is defined as a closed, as well as an open length measuring device. It is thus possible by the present invention to align and mount either only a scale, or a scale with a scanning unit, or a scale in a housing with a scanning unit contained therein.

Because of the continued improvement of the measuring accuracy of such length measuring devices, a correspondingly matched mounting accuracy with respect to their alignment by customary techniques becomes more and more elaborate. Measuring accuracies of ±5 μm or less are quite customary with such length measuring devices. Therefore the time required for the appropriate exact adjustment of the devices in the course of the mounting operations, for example on machine tools, is relatively great. Moreover, the mounting, or adjusting process itself is very difficult for a single assembler, particularly in connection with length measuring devices of some length.

A method and a device intended for mounting a scale or a scale support on an appropriate machine element are described in DE 199 14 311 A1. So that an undesired adhesive contact prior to the end of the alignment of the scale is prevented, spacers are proposed in this document, so that the scale can be definitely adjusted before it comes into contact with its support.

In DE 37 15 908 C2, a flexible scale with magnetic holders or suction cups is fastened on a body to be measured. This fastening which can be released relatively easily is also used during the measuring process itself. The disadvantage of this invention is that a permanent precise fixation of the scale is not possible in any way.

The same applies to published patent application EP 0 922 927 A2, wherein a magnetic fixation on the body to be measured is provided for the measuring process. There, too, the length measuring scale is not permanently brought into contact with the measuring body, and relatively low demands are made on the measuring accuracy.

SUMMARY AND OBJECTS OF THE INVENTION

An object of the present invention is based on disclosing a method for mounting a length measuring device, by which a simple and accurate alignment of the length measuring device, or of the scale, on its support becomes possible. It is moreover intended to disclose a length measuring device which is distinguished by easy manipulation and universal employment.

This object is attained by a method for mounting a length measuring device on a support that includes placing a length measuring device into frictionally adhesive contact with a support surface, wherein at least one mounting element exerts an attractive force between the support and the length measuring device, and the attractive force is of such a size that a corresponding frictional force assures a displaceability of the length measuring device relative to the support. Adjusting a position and direction of the length measuring device so that an orientation of the length measuring device, in the sense of the result of a length measurement, has a a tolerably small deviation from a desired direction. Connecting the length measuring device with the support so that the length measuring device cannot be displaced.

This object is also attained by a length measuring system that includes a length measuring device and at least one mounting element, which exerts an attractive force between a support and the length measuring device. One or more of the at least one mounting element are of such a size that a frictional force, which is a function of a total attractive force, assures on one hand an adhesion of the length measuring device to the support and, on another hand, also assures displaceablity of the length measuring device along the support during mounting.

So-called mounting elements, which exert an attractive force between the length measuring device and the support, for example the machine bed of a machine tool, are used for making mounting easier. If the support surface is perpendicularly arranged, an adhesive friction force results, which corresponds to the product of attractive force and the corresponding coefficient of friction. For the determination of the sum of the normal forces in connection with oblique or horizontal surfaces it is necessary to take into account, besides the total attractive force, also the weight with positive or negative signs in accordance with the respective inclination of the support. In accordance with the present invention, the sum of the attractive forces of all mounted elements is of such a size that, on the one hand, the length measuring device adheres to the surface of the support in the installed position but, on the other hand, the displacement of the device for adjusting purposes is still possible. This means that the length measuring device can possibly be manually displaced on the surface of the support and aligned.

Thereafter it is absolutely necessary for the permanent use of the entire system that the length measuring device be fixedly connected with the support, for example by screw connections. In this state the device cannot be inadvertently, or without being damaged, moved out of adjustment. Alternatively to this it is also possible to provide a permanent adhesive connection, as long as the adhesive permits a linear displacement of the length measuring device in the adjusting phase in which the length measuring device and the support adhere to each other. In this connection adhesives on the basis of epoxy resins, for example, are advantageous, which have a setting time which is greater than the time required for the exact alignment. The use of adhesives, whose setting phase can be specifically initiated from the outside, is practical. Adhesives can be used in this connection, whose setting is initiated, or significantly accelerated, by heat, UV radiation, moisture or other activators, for example. The length measuring device can be structurally adapted to these adhesives in an advantageous manner. For example, relatively large recesses or bezels can be provided at the end pieces, so that an increased adhesive surface is provided to the ways which initiate setting.

At the end of the setting time, a non-displaceable connection must also be assumed. The adhesive can be applied in spots over the entire contact surface, or over a considerable partial surface. In this case the level application of the adhesive can the be considered as a lineup of many adhesive spots.

Magnets are particularly suited as mounting elements. The use of permanent magnets is advantageous since, in comparison with electromagnets, it is possible here to dispense with the electrical auxiliary energy. If an embodiment variation is used which does not provide the removal of the mounting magnets at the end of mounting, the electromagnetic solution can also be advantageous, because in this case no magnetic forces are present during the operation of the length measuring device which—for example in connection with machine tool—could trigger the undesired attraction of metal chips. For the same reason an arrangement of the permanent magnets is provided in an embodiment variation of the present invention, wherein the magnets are completely surrounded by a steel housing of the length measuring device with the exception of their side facing the support. The size of the magnetic field toward the outside is minimized by the magnetic short circuit between the support and the magnets.

The use of suction cups as mounting elements for the temporary fastening of the length measuring device on the support is recited as a further embodiment of the present invention. These suction cups can become effective either by merely pressing the suction cup on, or also actively, for example by appropriate clamping devices or aided by compressed air.

With shorter length measuring devices the mounting elements are preferably located in the two end areas of the length measuring devices. However, particularly in connection with long length measuring devices, it can be advantageous to arrange several mounting elements over the entire length of the length measuring device, spaced apart in the measuring direction.

Exemplary embodiments of the present invention will be explained in greater detail by the drawings.

Figure 1A:
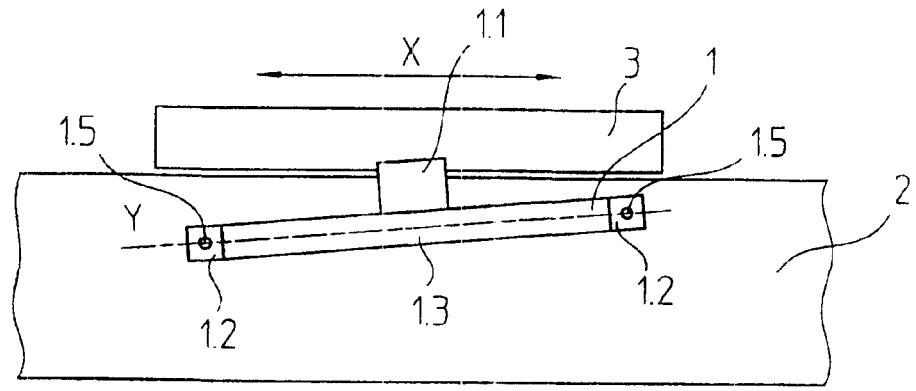
FIGS. 1a to 1c schematically show possible respective process steps for mounting the length measuring devices of FIGS. 2–8 in accordance with the present invention.

DESCRIPTION OF THE PREFERRED
EMBODIMENT(S) OF THE INVENTION

In the drawing figures and the description to follow, elements which are part of a component or have the same function are combined by identical first numbers of the reference numeral.

Figure 1B:
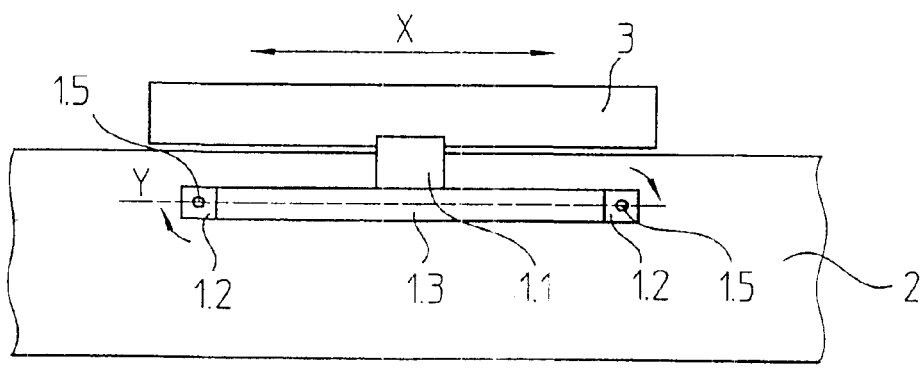
Figure 1C:
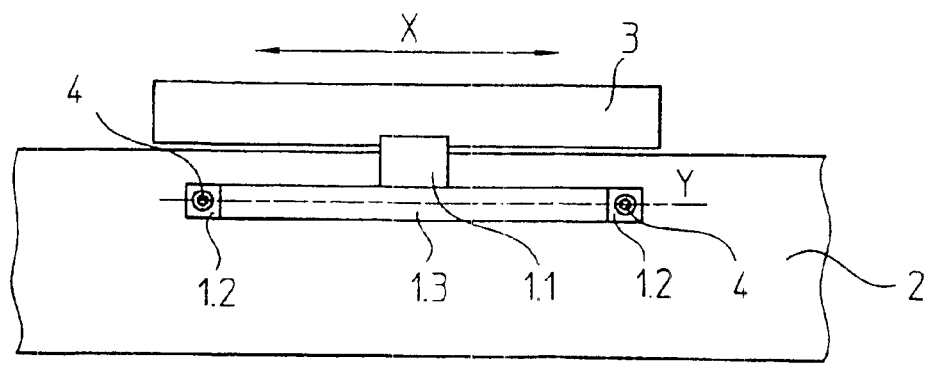

FIGS. 1a to 1c are essentially intended to explain the course of the method. The length measuring device 1, including the scanning unit 1.1, the end elements 1.2 and the encapsulated linear scale 1.3, is to be mounted on the support, in this case on the machine bed 2 of a machine tool. It is necessary in the course of this to assure that the alignment Y of the length measuring device 1 is as parallel as possible to the desired direction X. The desired direction X corresponds to the direction of guidance of the movable carriage 3 of the machine tool.

FIG. 1a represents the position of the length measuring device 1 during the first mounting step. To make the situation clear, the deviation of the actual alignment Y from the desired direction X is exaggerated. In this first mounting step, the length measuring device 1 is put into frictional contact on the perpendicular flat surfaces of the machine bed 2 without use of exact measuring processes and in a first approximation parallel with respect to X. Following this mounting phase, the length measuring device 1 adheres to the machine bed 2 without manual support. If the play between the exterior thread of the screws 4 and the interior diameter of the bore 1.5 is of sufficient size, it is already possible to loosely thread the screws 4 through the bores 1.5 during the first mounting step. Various ways and embodiments for achieving the required adhesive friction will be described later by FIGS. 2a to 8b.

In the second mounting step, represented in FIG. 1b, it is then easily possible to perform the exact alignment of the length measuring device 1 with the required measuring processes. Because the length measuring device 1 adheres to the machine bed 2 without any aid from the assembler, but is nevertheless comparatively easily manually displaceable, a quick and very exact adjustment is possible. No undesired mechanical loads on the measuring device 1 occur in the course of the alignment, because an improper mounting, for example an alignment of the already screw-connected length measuring device 1 by beating on it, can be prevented with this method. It is of course possible to provide a lubricant or sliding additive between the length measuring device 1 and the machine bed 2 in order to ease the displaceability, or to avoid so-called slip-stick effects. The bores 1.5 are used for receiving screws 4 for the final fastening after the exact alignment of the length measuring device 1 on the machine bed 2. It is also necessary in the course of displacing the length measuring device 1 to assure that the bores 1.5 in the length measuring device 1 match the corresponding bores with an interior thread in the machine bed 2. As a rule, the bores 1.5 have a slightly larger interior diameter than the diameter of the exterior thread of the associated screws 4. In this way sufficient play is provided for making the alignment possible without it being necessary to perform drilling during the mounting process.

The last mounting step is represented in FIG. 1c. After the adjustment is finished, for example with a deviation of the actual direction Y from the desired direction X of less than 0.1 degrees of angle, the length measuring device 1 is solidly and immovably fixed on the machine bed by mechanical connections such as rivets and/or screws 4. In this state the scanning unit 1.1 can be displaced almost parallel in relation to the desired direction X, i.e. the movement direction of the carriage 3.

An end element 1.2 of a housing of the length measuring device 1 is represented in each of FIGS. 2 to 8. Like the rest of the housing, these end elements 1.2 are often made of aluminum, i.e. of a non-ferromagnetic material.

Figure 2A:
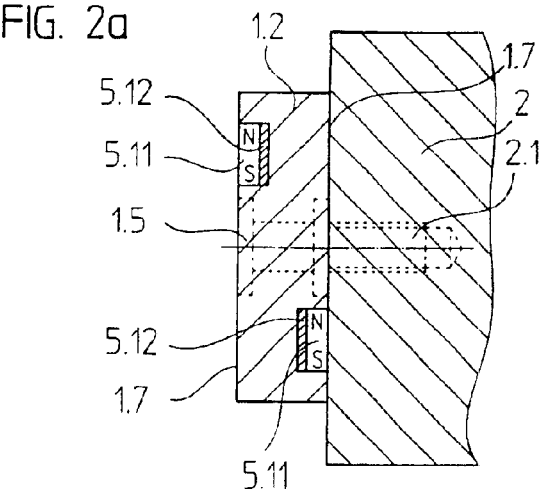
FIGS. 2A, 2b show a cross section and a partial view from above on an end element of a first embodiment of a length measuring device with permanent magnet units in accordance with the present invention.
Figure 2B:
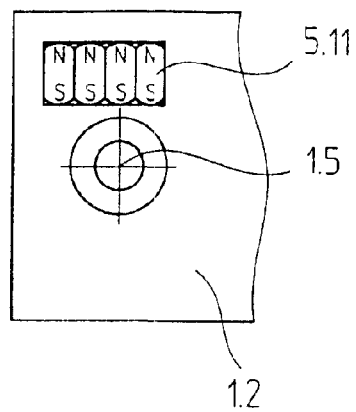

FIGS. 2a and 2b show an arrangement in which the mounting elements are permanent magnets 5.11. In this case the machine bed 2 is made of a ferromagnetic material, for example of steel. If required, the permanent magnets 5.11 can be backed by a rear closure plate 5.12 for increasing the attractive force, in particular if there is an aluminum housing. For example, the magnets can be glued to the rear closure plate 5.12, or the attractive force of the magnets on the rear closure plate 5.12 can be used for fixation. In this case the rear closure plate 5.12 can be inseparably connected with the housing by gluing.

Basically, it is advantageous for all exemplary embodiments that the mounting elements are designed in such a way that they do not become separated, or fall of, from the length measuring device 1 in the course of the mounting work.

If magnets are used as mounting elements, they are preferably inserted into the housing of the length measuring device 1 in such a way that their surface is flush with the surface of the length measuring device 1, or is slightly set back. It is achieved by this construction that the corresponding surfaces of the length measuring device 1 and of the machine bed 2 are in contact during the entire mounting phase. So that the length measuring device 1 can be mounted by the method of the present invention on both possible attachment surfaces 1.7, the mounting elements in the exemplary embodiments in accordance with FIGS. 2 to 4, as well as 7 and 8, are arranged, or can be arranged, symmetrical, in particular point-symmetrical, with respect to the center of the cross section of the length measuring device.

Figure 3A:
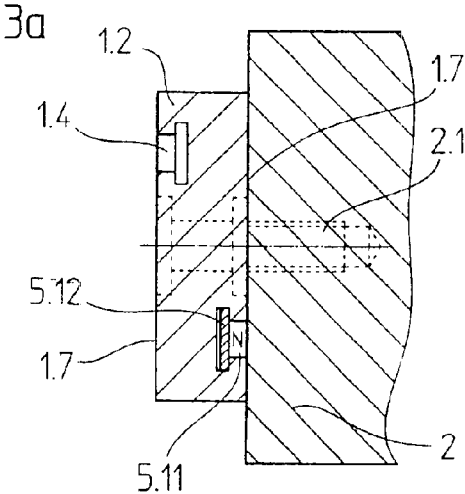
FIGS. 3a, 3b show a cross section and a partial view from above on an end element of a second embodiment of a length measuring device with removable permanent magnet units in accordance with the present invention.
Figure 3B:
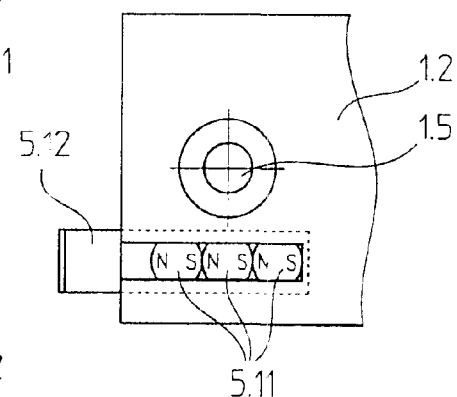

FIGS. 3a and 3b show a variation, wherein the mounting element is embodied as a removable permanent magnet unit 5.1 with a corresponding rear closure plate 5.12. So that the permanent magnets 5.11 and the rear closure plate 5.12 are sufficiently secure against falling out, undercut recesses 1.4 are provided here in the end elements 1.2 of the length measuring element 1, which are used as guides for the rear closure plate 5.12. To ease the pulling out of the permanent magnet unit 5.1, the rear closure plate 5.12 is appropriately bent at one end (in the partial view from above in FIG. 3b, the rear closure plate 5.12 projects out of the drawing plane at one end). The removed permanent magnet unit 5.1 can be used again with another length measuring device 1 to be mounted.

Figure 4A:
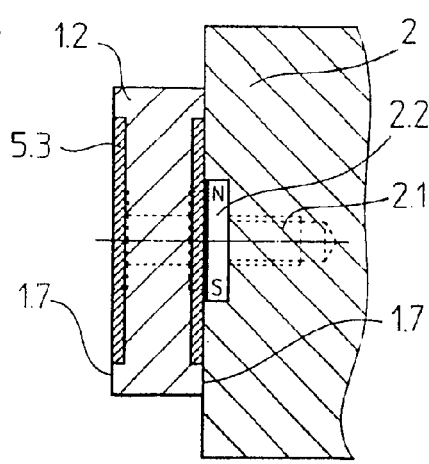
FIGS. 4a, 4b show a cross section and a partial view from above on an end element of a third embodiment of a length measuring device with magnets in the machine bed in accordance with the present invention.
Figure 4B:
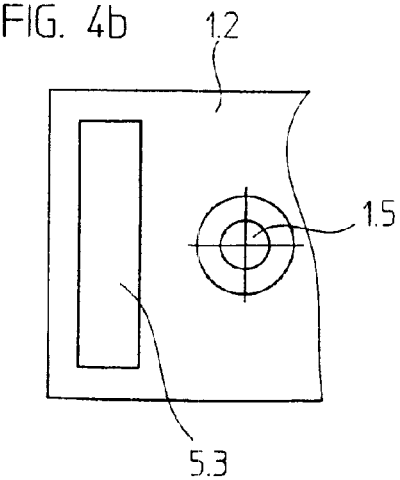

FIGS. 4a and 4b show an embodiment variation, wherein the machine bed 2 includes a non-ferromagnetic material, such as granite or polymer concrete, for example. A permanent magnet 2.2 can be inserted into the machine bed 2 here, which then interacts with a ferromagnetic insert 5.3 of the length measuring device. It is of course possible to embody the inserts in the length measuring device 1 in the form of permanent magnets, similar to FIGS. 2 and 3, if corresponding magnetically attractive reaction elements, for example strips of steel plate, are then provided in the non-ferromagnetic machine bed 2.

Figure 5A:
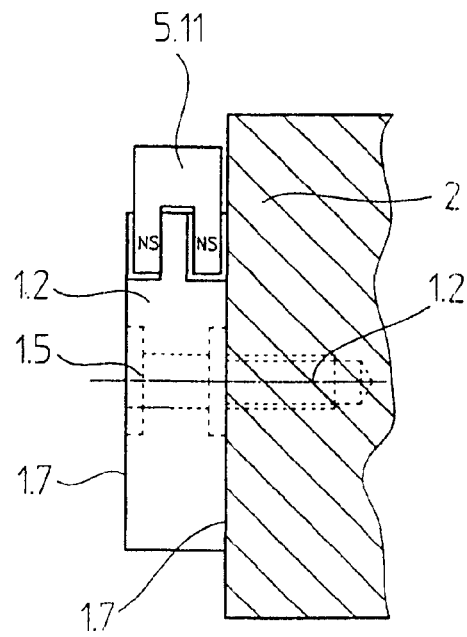
FIGS. 5a, 5b show a cross section and a partial view from above on an end element of a fourth embodiment of a length measuring device with a permanent magnet stuck on it in accordance with the present invention.
Figure 5B:
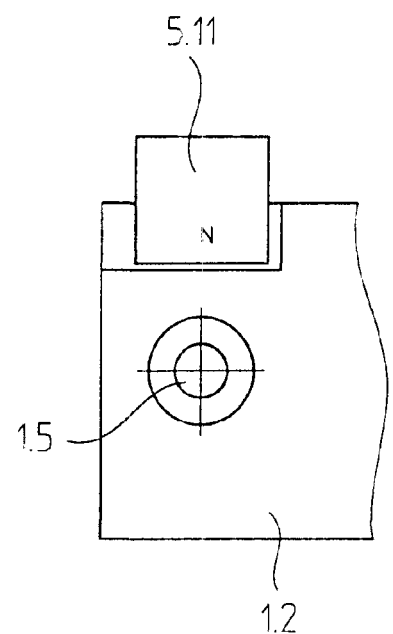

Alternatively to the embodiments represented so far, an arrangement is represented in FIGS. 5a and 5b, in which a horseshoe-shaped permanent magnet 5.11 extends around the respective end element 1.2. A supporting frictional connection is created by the magnetic attractive force between the machine bed 2 and the permanent magnet 5.11. This frictional connection has a support ability which is sufficiently strong so that the frictional connection is not released even during displacement movement in the course of the adjusting process. The permanent magnets 5.11 can be pulled off in a simple manner after the mounting process.

Figure 6A:
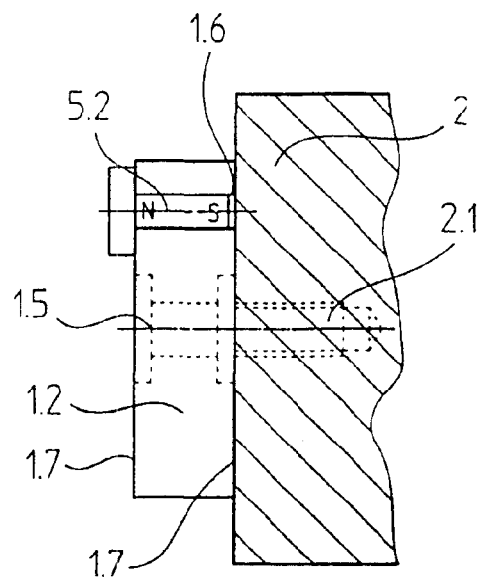
FIGS. 6a, 6b show a cross section and a partial view from above on an end element of a fifth embodiment of a length measuring device with an inserted magnetic pin in accordance with the present invention.
Figure 6B:
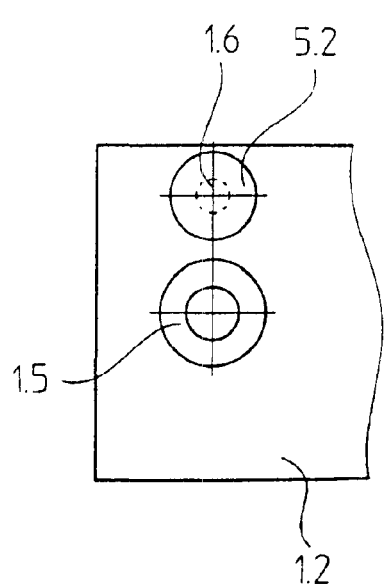

A variation is represented in FIGS. 6a and 6b, wherein a magnetic pin 5.2 can be inserted into an auxiliary bore 1.6 in the end element 1.2 of the length measuring device 1. This variation is distinguished by its simple construction. In contrast to the variation in FIG. 5, an interlocking force transfer between the permanent magnet 5.1 and the end element 1.2 is provided here. Here, too, the length measuring device 1 in accordance with the method of the present invention can be fastened on both possible attachment surfaces 1.7 of the machine bed 2. The magnetic pin 5.2 should be designed in such a way that it cannot fall out in the course of the mounting operations. The embodiment shown, wherein the pin 5.2 is secured by an appropriately tight fit, is particularly advantageous from the viewpoint of production costs.

Alternatively to this it is also possible for axial securing to provide a plastic element, which is pushed against the wall of the auxiliary bore 1.6 in the course of introducing the pin 5.2, or an appropriate screw thread.

Figure 7A:
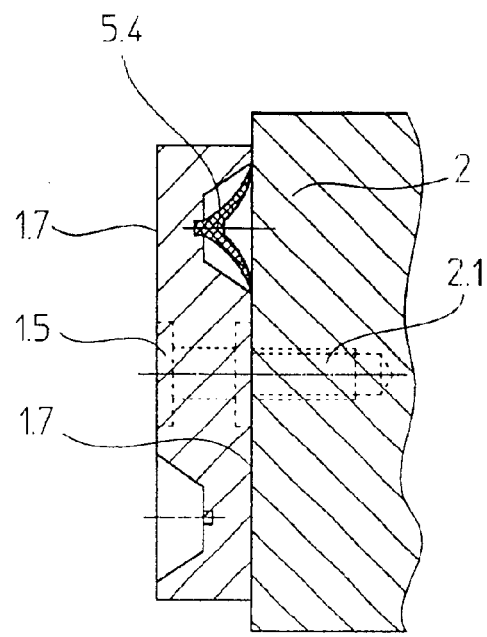
FIGS. 7a, 7b show a cross section and a partial view from above on an end element of a sixth embodiment of a length measuring device with suction cups in accordance with the present invention.
Figure 7B:
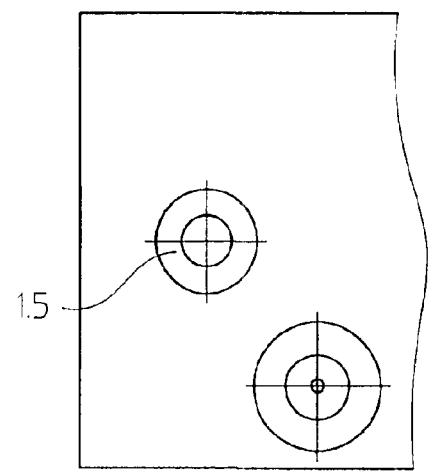

An embodiment variation is represented in FIGS. 7a and 7b, wherein the adhesive friction is caused by suction cups 5.4 made of a polymer material. Here, too, the application of a lubricant or a sliding additive can be particularly advantageous, for one, to increase the displaceability, and furthermore to prevent the penetration of air into the underpressure area of the suction cup 5.4.

Figure 8A:
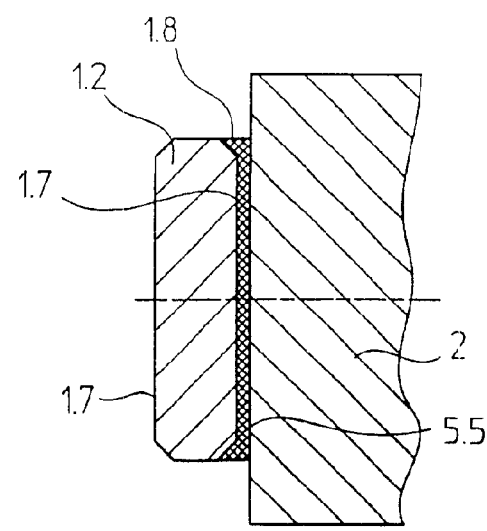
FIGS. 8a, 8b show a cross section and a partial view from above on an end element of a seventh embodiment of a length measuring device with an adhesive connection in accordance with the present invention.
Figure 8B:
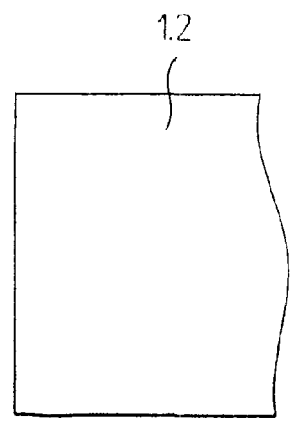

Finally, an exemplary embodiment is represented in FIGS. 8a and 8b, wherein the adhesive connection is produced by a glue connection 5.5. In this case the glue connection 5.5 can be used as a mounting element, as well as a permanent fastening for the length measuring device 1. In this case the length measuring element 1 is provided with bezels 1.8 of comparatively large size. An adhesive is applied to the attachment surface 1.7, which is distinguished in that its setting process can be triggered by UV radiation. As soon as the length measuring device 1 has been adjusted with sufficient accuracy, the visible glue joints are radiated with UV radiation by the assembler. The polymerization process of the adhesive is started in this way. Setting in the areas of the glue connection 5.5 where no UV radiation penetrates is made possible by an anaerobic secondary system of the glue. Since the glue connection 5.5 shows great strength in the set state, the use of the screws 4 can be dispensed with.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for mounting a length measuring device on a support comprising:
    placing a length measuring device into frictionally adhesive contact solely with a surface of a support, wherein at least one mounting element exerts an attractive force between said support and said length measuring device, and said attractive force is of such a size that a corresponding frictional force assures a displaceability of said length measuring device relative to said support;
    adjusting a position and direction of said length measuring device so that an orientation of said length measuring device, in the sense of the result of a length measurement, has a tolerably small deviation from a desired direction; and
    connecting said length measuring device with said support so that said length measuring device cannot be displaced.

2. The method in accordance with claim 1, wherein said length measuring device is a pre-assembled unit comprising a linear scale and a scanning unit.

3. The method in accordance with claim 1, wherein said at least one mounting element comprises at least two spaced apart mounting elements arranged on said length measuring device by which said length measuring device is connected with said support.

4. The method in accordance claim 1, wherein said at least one mounting element exerts a magnetic attractive force between said support and said length measuring device.

5. The method in accordance with claim 1, wherein said at least one mounting element exerts an attractive force, which is caused by underpressure, between said support and said length measuring device.

6. The method in accordance with claim 1, wherein said connecting comprises said length measuring device is connected in a non-displaceable manner with said support by an adhesive connection in at least two points.

7. The method in accordance with claim 6, wherein said adjusting comprises having said adhesive connection in a state which permits a displacement of said length measuring device in relation to said support, and thereafter leads to a solid connection between said length measuring device and said support.

8. The method in accordance with claim 1, further comprising removing at least one of said at least one mounting element.

9. The method in accordance with claim 1, wherein said connecting comprises having said length measuring device is connected in a non-displaceable manner with said support via mechanical connections in at least two points.

10. A method for mounting a length measuring device on a support comprising:
    placing a length measuring device into frictionally adhesive contact with a surface of a support, wherein at least one mounting element exerts an attractive force between said support and said length measuring device, and said attractive force is of such a size that a corresponding frictional force assures a displaceability of said length measuring device relative to said support;
    adjusting a position and direction of said length measuring device so that an orientation of said length measuring device, in the sense of the result of a length measurement, has a tolerably small deviation from a desired direction; and
    connecting said length measuring device with said support so that said length measuring device cannot be displaced, wherein said connecting comprises having said length measuring device connected in a non-displaceable manner with said support via mechanical connections in at least two points.

11. A length measuring system, comprising:
    a length measuring device;
    at least one mounting element, which exerts an attractive force between a support and said length measuring device; wherein one or more of said at least one mounting element are of such a size that a frictional force, which is a function of a total attractive force, assures on one hand an adhesion of said length measuring device solely to said support and, on another hand, also assures displaceablity of said length measuring device along said support during mounting.

12. The length measuring device in accordance with claim 11, wherein said length measuring device is an already pre-assembled unit comprising at least of one linear scale and at least one scanning unit.

13. The length measuring device in accordance with claim 11, wherein said at least one mounting element is arranged in such a way that said length measuring device can be alternatively brought into an adhesive frictional contact with a support on at least two attachment surfaces.

14. The length measuring device in accordance with claim 11, wherein said at least one mounting element comprises at least two mounting elements arranged on said length measuring device.

15. The length measuring device in accordance with claim 14, wherein said at least two mounting elements are arranged on two end sections of said length measuring device.

16. The length measuring device in accordance with claim 11, wherein one or more of said at least one mounting element exerts a magnetic attractive force between said support and said length measuring device.

17. The length measuring device in accordance with claim 16, wherein said one or more of said at least one mounting element comprises at least one permanent magnet arranged for generating a magnetic attractive force between said support and said length measuring device.

18. The length measuring device in accordance with claim 16, wherein said one or more of said at least one mounting element comprises at least one switchable magnet is arranged for generating a magnetic attractive force between said support and said length measuring device.

19. The length measuring device in accordance with claim 18, wherein said at least one switchable magnet comprises an electromagnet.

20. The length measuring device in accordance with claim 16, wherein said one or more of said at least one mounting element are provided with rear closure plates on surfaces facing away from said support.

21. The length measuring device in accordance with claim 16, wherein said length measuring device comprises at least one auxiliary bore extending into said length measuring device, into which cylindrical magnets are inserted.

22. The length measuring device in accordance with claim 11, wherein said at least one mounting element is fastened in said length measuring device with the aid of several undercut recesses.

23. The length measuring device in accordance with claim 22, wherein said several undercut recesses comprise dovetailed recesses.

24. The length measuring device in accordance with claim 11, wherein said at least one mounting element comprises at least one ferromagnetic reaction element attached to said length measuring device, which is attracted by one or several magnets housed in said support.

25. The length measuring device in accordance with claim 11, wherein said at least one mounting element creates an attractive force, which is caused by underpressure, between said support and said length measuring device.

26. The length measuring device in accordance with claim 11, wherein said length measuring device is designed in such a way that at least a part of said at least one mounting element can be removed after mounting has been completed.

* * * * *

UNITED STATES PATENT AND TRADEMARK OFFICE
CERTIFICATE OF CORRECTION

| | | |
|---|---|---|
| PATENT NO. | : 6,871,417 B2 | Page 1 of 1 |
| APPLICATION NO. | : 10/333966 | |
| DATED | : March 29, 2005 | |
| INVENTOR(S) | : Sebastian Tondorf | |

It is certified that error appears in the above-identified patent and that said Letters Patent is hereby corrected as shown below:

On the Title Page Item [56]

In column 2, line 2, delete "Kopidlowski et al." and substitute --Vershowske et al.-- in its place.

In column 2, line 13, delete "McMurtry et al." and substitute --Henshaw et al.-- in its place.

Signed and Sealed this

Twenty-seventh Day of November, 2007

JON W. DUDAS
*Director of the United States Patent and Trademark Office*